US009266292B2

(12) United States Patent
Leibler et al.

(10) Patent No.: US 9,266,292 B2
(45) Date of Patent: Feb. 23, 2016

(54) EPOXY ACID THERMOSET RESINS AND COMPOSITES THAT CAN BE HOT-FASHIONED AND RECYCLED

(75) Inventors: Ludwik Leibler, Paris (FR); Damien Montarnal, Paris (FR); François-Genes Tournilhac, Paris (FR); Mathieu Capelot, Paris (FR)

(73) Assignees: CENTRE NATIONAL DE LA RECHERCHE SCIENTIFIQUE, Paris (FR); ARKEMA FRANCE, Colombes (FR)

( * ) Notice: Subject to any disclaimer, the term of this patent is extended or adjusted under 35 U.S.C. 154(b) by 253 days.

(21) Appl. No.: 13/118,536

(22) Filed: May 30, 2011

(65) Prior Publication Data
US 2011/0319524 A1 Dec. 29, 2011

(30) Foreign Application Priority Data

May 31, 2010 (FR) ...................................... 10 54213
Feb. 3, 2011 (FR) ...................................... 11 50888

(51) Int. Cl.
*C08F 20/00* (2006.01)
*C08L 63/00* (2006.01)
(Continued)

(52) U.S. Cl.
CPC .............. *B29C 73/02* (2013.01); *B29C 73/163* (2013.01); *C08G 59/4207* (2013.01); *C08L 63/00* (2013.01); *C09D 163/00* (2013.01); *B29K 2063/00* (2013.01)

(58) Field of Classification Search
CPC ..................................................... B29C 73/02
USPC ......................................... 525/533; 523/533
See application file for complete search history.

(56) References Cited

U.S. PATENT DOCUMENTS 3,449,274 A    6/1969  Salensky .................... 523/177
3,523,143 A *  8/1970  Kwong ....................... 525/532
(Continued)

FOREIGN PATENT DOCUMENTS

EP    1 176 175    1/2002
EP    1 493 766    1/2005
(Continued)

OTHER PUBLICATIONS

Dusek et al., "Transesterification and Gelation of Polyhydroxy Esters Formed from Diepoxides and Dicarboxylic Acids", Rubber-Modified Thermoset Resins, Chapter 2, Advances in Chemistry Series, vol. 208, Dec. 5, 1984, American Chemical Society, p. 15-26.*

(Continued)

*Primary Examiner* — David Karst
(74) *Attorney, Agent, or Firm* — Norton Rose Fulbright US LLP

(57) ABSTRACT

Resins and thermoset composites comprising them, these materials being able to be hot-fashioned. These compositions resulting from placing at least one thermosetting resin precursor, this thermosetting resin precursor comprising hydroxyl functions and/or epoxy groups, and optionally ester functions, in contact with at least one hardener chosen from carboxylic acids, in the presence of at least one transesterification catalyst whose total molar amount is between 5% and 25% of the total molar amount of hydroxyl and epoxy contained in the thermosetting resin precursor. Process for manufacturing these materials, process for transforming and process for recycling these materials. New solid forms of resins and of thermoset composites that may be used in the implementation of these processes.

16 Claims, 4 Drawing Sheets

(51) Int. Cl.
*C08G 59/42* (2006.01)
*B29C 73/02* (2006.01)
*B29C 73/16* (2006.01)
*C09D 163/00* (2006.01)
*B29K 63/00* (2006.01)

(56) References Cited

U.S. PATENT DOCUMENTS

| | | | | |
|---|---|---|---|---|
| 4,131,715 A | * | 12/1978 | Frankel | 428/413 |
| 4,423,169 A | * | 12/1983 | Valko | 523/414 |
| 4,906,693 A | * | 3/1990 | Craun et al. | 525/176 |
| 5,470,609 A | | 11/1995 | Leach et al. | 427/140 |
| 2008/0299323 A1 | | 12/2008 | Flosbach et al. | 427/487 |

FOREIGN PATENT DOCUMENTS

| | | |
|---|---|---|
| GB | 1 215 069 | 12/1970 |
| GB | 1 326 773 | 8/1973 |
| WO | WO 02/064653 | 8/2002 |

OTHER PUBLICATIONS

Aflal et al., "Crack-healing behavior of epoxy—amine thermosets," *J Applied Polymer Sci* 113(4): 2191-2201, Aug. 15, 2009.

Chen et al., "A thermally re-mendable cross-linked polymeric material," *Science* 295(5560): 1698-1702, Mar. 1, 2002.

Lehn, "Dynamers: dynamic molecular and supramolecular polymers," *Progress in Polymer Science* 30(8-9): 814-831, Aug./Sep. 2005.

Outwater and Gerry, "On the Fracture Energy, Reheating Velocity and Refracture Energy of Cast Epoxy Resin," *Journal of Adhesion* 1(4): 290-298, 1969.

Skene and Lehn, "Dynamers: polyacylhydrazone reversible covalent polymers, component exchange, and constitutional diversity," *Proc Natl Acad Sci USA* 101(22): 8270-8275, Jun. 1, 2004.

International Search Report and Written Opinion, issued in International Patent Application No. PCT/FR2011/051231, mailed on Sep. 27, 2011.

* cited by examiner

EPOXY ACID THERMOSET RESINS AND COMPOSITES THAT CAN BE HOT-FASHIONED AND RECYCLED

1. FIELD OF THE INVENTION

The invention relates to novel crosslinkable systems with thermoplastic elastomer properties, these systems being based on epoxy resin. More particularly, the invention relates to resins and thermoset composites comprising them, these materials being able to be hot-fashioned. The invention also relates to a process for manufacturing these materials, to a transformation process and to a process for recycling these materials. The invention also relates to novel solid forms of resins and of thermoset composites that can be used in the implementation of these processes. The fields of application are those of flexible materials and composites, elastomers, coatings, adhesives and glues. The present invention especially relates to a process for assembling or repairing articles based on epoxy resin and also to a repairable epoxy resin-based composition for implementing the process.

In the field of flexible composites, three classes of materials may be schematically distinguished as a function of the type of resin used as matrix: composites with a flexible thermoplastic matrix, composites with a flexible thermosetting matrix and finally composites with a thermoplastic elastomer matrix.

Flexible thermoplastic resins are non-crosslinked polymers such as polyethylene or PVC, whose flexibility is obtained by adding plasticizers. These resins may be processed and optionally reprocessed at high temperature. However, they have the drawback of having a high viscosity in the melt, which makes it difficult to impregnate reinforcing fibres or fillers, and moreover, due to the presence of plasticizers, the harmlessness and the long-term stability of these materials is not satisfactory either.

Flexible thermosetting resins are crosslinked polymers. They are, for example, epoxy resin formulations in which the epoxy precursor and/or the hardener are chosen so as to obtain soft materials. These resins are processed before crosslinking starting with precursors that are low-viscosity liquids.

These compositions have the advantage of having high fluidity before crosslinking, which facilitates the impregnation of fillers or fibres for the manufacture of composites. They also have very good thermal resistance and mechanical strength and also good resistance to solvents.

On the other hand, they have the drawback of not allowing reforming of the composite material obtained or recycling of the resin after reaction.

Thermoplastic elastomers, for instance block copolymers based on microphase separation (of SBS/SEBS/SIS, polyurethane/PEBA, ionomer or supramolecular elastomer type) themselves have the advantage of allowing reforming after obtaining the composite. However, their poor fluidity is a serious drawback for their use, especially when it is necessary to impregnate a support of these compositions, in particular a support such as fibres or fillers.

Thermoplastic elastomers also have the drawback of having poor resistance to high temperatures and to solvents, in particular to oils. They do not allow the user to make an extemporaneous formulation as a function of the needs as easily as epoxy resins (choice of the resin/hardener mixture, followed by curing).

To overcome these drawbacks, the inventors have developed novel systems, based on epoxy resin, and thus thermosetting systems, which have behaviour of thermoplastic elastomer type. By definition, a thermoset is a polymer that hardens under the action of energy, in particular under the action of heat. Materials manufactured from thermosetting polymers have the advantage of being able to be hardened so as to have high mechanical, thermal and chemical strength and, for this reason, can replace metals in certain applications. They have the advantage of being lighter than metals. They may also be used as matrices in composite materials. Among the thermosetting polymers, mention may be made of unsaturated polyesters, phenoplasts, polyepoxides, polyurethanes and aminoplasts.

According to the invention, the term "epoxy resin" means any monomer substance, oligomer or mixture of oligomers comprising oxirane functional groups (also known as epoxy functions), and the term "epoxy polymer" means any product of the reaction of an epoxy resin with one or more hardeners, which, most commonly, are amines, carboxylic acids or acid anhydrides. Epoxy polymers themselves serve to formulate epoxy materials that may be in the form of composites, foams, adhesives, paints and other coatings, and find applications in very diverse fields (construction, motor vehicle, nautical, aeronautical, electronic, clothing, sporting equipment, etc. fields).

Thermosets, in particular epoxy resins, are moulded and crosslinked at elevated temperature or at room temperature. The processing is performed via the liquid route starting with monomers. They thus have the drawback of requiring precise manipulations and metering of liquids for their processing. The transportation of precursor compounds, in liquid form, is not satisfactory either in terms of safety.

In addition, standard thermosets must be manufactured, and in particular they must be moulded, having at the outset the appropriate shape for the final use. The reason for this is that no further transformation is possible once they are polymerised, aside from machining, which remains delicate on account of their fragility. Flexible or hard components and composites based on thermosetting resins are neither transformable nor fashionable, and cannot be recycled. Among the problems encountered with materials based on thermosetting resin, especially based on epoxy resin, the following may be mentioned: wall paints or paints for motor vehicle bodyworks have a tendency to become scratched; mechanical components have a tendency to crack or to become damaged as a result of their use, which makes it necessary to replace them. In the current context of environmental protection, reducing waste and reducing energy consumption, it is increasingly sought to prolong the lifetime of components and materials based on thermosetting resin, especially epoxy resin. One of the means for prolonging the lifetime of components and materials based on epoxy resin is to be able to repair them. Moreover, for the processing of large-sized components or complex components, it is advantageous to be able separately to prepare several elements and then to assemble them as a single article, in the same way that the fragments of a broken article are reassembled.

In parallel with thermosetting resins, a class of polymeric materials, thermoplastics, has been developed. Thermoplastics can be formed at high temperature by moulding or by injection, but have less advantageous mechanical properties and thermal and chemical strength properties than thermosets.

In addition, the forming of thermoplastics can only be performed within very narrow temperature ranges. The reason for this is that when thermoplastics are heated, they become liquid, the fluidity of which varies abruptly in the region of the melting points and the glass transition temperatures, which does not allow application thereto of a whole variety of transformation methods that exist for glass and for metals, for example.

One of the objects of the invention was the development of thermosetting resins that are hot-transformable after hardening. In particular, the materials of the invention have the property of being able to be heated to temperatures such that they become liquid without suffering destruction or degradation of their structure. The viscosity of these materials varies slowly over a broad temperature range, with behaviour that approaches the Arrhénius law. This property allows them to undergo transformations via very varied processes that cannot be envisaged for thermoplastics. It especially makes it possible to obtain objects having shapes that are difficult or impossible to obtain by moulding or for which the production of a mould proves to be too expensive for the envisaged manufacture. Moreover, the invention makes possible the controlled trapping and relaxation of local constraints.

The presence of hydroxyl functions promotes the adhesion of the compositions of the invention to materials such as wood, glass and metals, and thus allows the manufacture of very strong composites and their use as glues and coatings. The invention makes it possible to develop novel applications for thermosetting materials by facilitating their forming and their recycling. Thus, it can open up fields of application and processing methods for thermosetting resins, especially epoxy resins, that were not in any way envisagable hitherto. Finally, the invention makes it possible to overcome the problems of metering out and handling liquids that were hitherto inherent in the use of thermosets.

The materials of the invention may be optionally formed like standard thermosetting resins advantageously using their fluidity before crosslinking, or like thermoplastics after the crosslinking reactions, or alternatively by hot fashioning via specific methods.

2. DESCRIPTION OF RELATED ART

It is known from the prior art (Aflal et al., *Appl. Polym. Sci.* 2009, 113, 2191) to repair an article based on epoxy resin. The solution proposed consisted in only partially reacting the epoxy functional groups during the manufacture of the article. This was able to be performed by using a sub-stoichiometric amount of hardener. To repair a damaged article, a high temperature is then applied to the part of the article concerned such that the epoxy functions that have remained free react together and form covalent bonds.

Another method known from patent application WO 02/064 653 for repairing a polymer-based article consists in dispersing in the polymer microcapsules filled with a polymerisable agent. Damage of the article brings about rupture of the microcapsules and the release of the polymerisable agent into the fracture. The polymerisation of this agent allows the fracture to be repaired.

Document U.S. Pat. No. 5,470,609 describes a process for repairing surface defects of articles made of a plastic material. Such articles were hot-crosslinked and are repaired using a coating composition comprising the constituents of a resin that have not reacted together. Their reaction is triggered after placing in contact with the surface to be repaired.

However, these methods are limited to the repair of articles and cannot envisage the recycling of thermosetting resins or their transformation, once hardened, into an article having another shape. In addition, these repair methods allow the article to be repaired a maximum of only once or twice. Specifically, when all the epoxy functions have reacted—or when the polymerisable agents have polymerised—it is no longer possible to repair the component or the material. Finally, materials comprising capsules usually have inferior mechanical properties to those of the resins of which they are composed.

Polymeric systems using reversible covalent bonds have already been described. Thus, Lehn, J. M., *Progress Polym. Sci.*, 2005, 30, 814-831 and Skene W. G., Lehn, J. M., *P.N.A.S.* 2004, 22, 8270-8275 disclose polymeric resins that are capable of depolymerising and of repolymerising under the action of heat. The team of Professor Wudl (Chen X. et al., *Science* 2002, 295, 1698-1702) has described self-repairing materials based on the reversibility of the Diels-Alder reaction.

However, these studies concern only the repair and assembly of components and do not envisage the transformation of an article based on thermosetting resin into an article of a different shape.

The document J. O. Outwater, D. G. Gerry, *J. Adhesion*, vol. 1, 1969, 290-298 mentions the possibility of heat-repairing a fracture in an epoxy resin. It is taught in that document that the energy restitution associated with the disappearance of the fracture surfaces is responsible for this phenomenon. However, these observations have not been repeated in more than 40 years and have not led to any development. Furthermore, the resin composition that was used in that document does not correspond to the definition of the compositions of the invention and does not make it possible to transform an article or to be subjected to recycling.

According to the present invention, thermosetting resins are endowed with chemical reversibility, which, when combined with a mechanical constraint, may be used to give an article a new shape.

Furthermore, the resin compositions of the invention are also distinguished from those of the prior art in that they are not special resins but are composed of an ordinary thermosetting resin, in particular an ordinary epoxy resin, an acidic hardener capable of reacting with epoxide functions generating hydroxyl and ester functions, a standard esterification catalyst and an identical or different transesterification catalyst. They differ from standard epoxy resins by the presence of amounts of transesterification catalyst higher than those usually used, since transesterification is not usually desired or envisaged.

These compositions and the processes of the invention may thus be used in all the usual applications of thermosetting resins, in particular flexible epoxy resins, but have the advantageous properties that have been mentioned above and are illustrated in detail in the description and the implementation examples. The compounds and processes of the invention may also be used in the conventional applications of thermoplastic elastomers, for which they have the advantageous properties of epoxy resins, especially thermal resistance, chemical strength, a high softening point or low shrinkage.

SUMMARY OF THE INVENTION

One subject of the invention is a thermosetting resin composition, this composition resulting from the reaction of at least one thermosetting resin precursor containing hydroxyl functions and/or epoxy groups with at least one hardener that contains carboxylic acid functional groups, in the presence of at least one transesterification catalyst, the amount and functionality of the acid being chosen such that the resin is in the form of a network maintained by ester functions and that free hydroxyl functions remain after reaction of the precursor with the hardener.

A subject of the invention is also composite materials comprising such a resin composition, a process for manufacturing an article or a material based on this resin, a process for transforming a resin-based article or material, a process for assembling and bonding materials and composites based on this resin, a process for repairing an article based on this resin, a process for recycling a resin-based article. A subject of the invention is also a process for repairing a component or a material based on epoxy resin that especially makes it possible to repair the component or material based on epoxy resin as many times as necessary. The process also makes it possible to assemble components based on epoxy resin.

More specifically, a subject of the invention is a process for assembling or repairing articles based on epoxy resin, at least one of the hardeners of which contains carboxylic acid functional groups. The assembly or, after damage, the repair of the article may be performed by applying a temperature (T) above room temperature, provided that there is good contact between the parts to be assembled. This contact may be obtained, for example, by applying a mechanical pressure at a temperature (T) above the glass transition temperature Tg of the material.

The inventors have found that it is possible to assemble or repair, as many times as necessary, an epoxy resin crosslinked with an acidic hardener, which has undergone damage, by subjecting it to a temperature above room temperature, simultaneously or otherwise with a mechanical constraint. Without being bound by this explanation, the inventors think that during the hot step, the ester functions obtained after the epoxy-acid reaction become exchanged. In this manner, new ester functions are created, in particular at the place of the damage.

The invention also relates to articles made of thermosetting material that may be obtained via one of the processes of the invention.

The invention is based on the transesterification reactions that may take place when a polymer contains both ester functions and hydroxyl functions.

To allow these transesterifications and to obtain materials that have thermoplastic elastomer behaviour, epoxy resins are polymerised using as hardeners molecules comprising at least two carboxylic acid functions.

In order for the transesterification reaction to be exploitable over a range of temperatures that does not lead to destruction of the material and over controllable timescales, the invention makes use of a catalyst.

Relative to thermoplastic resins, which are also capable of being hot-transformed, the material according to the invention can be worked without flowing under its own weight over a much broader range of temperatures, which makes it possible to apply varied transformation methods, especially without the imperative need for moulding. These methods are of the same nature as those used in the metal and glass fields.

This method also makes it possible, by applying a sufficient temperature and an appropriate mechanical constraint, to mould articles made of a thermosetting material from thermoset material. The method also makes it possible, by applying a sufficient temperature and with good contact of the components, to assemble components by welding so as to form a more complex article. The method also makes it possible, by applying a sufficient temperature and a mechanical constraint, to repair a crack or damage caused in a component formed from the material. It may also be envisaged to manufacture sandwich structures from sheets of thermoset material of the invention which intercalate and act as glue between materials such as wood, glass, plastic or metal, for example.

Another advantage of this process is that it allows the recycling of the material after use, the components being able to be reconditioned in the form of elemental units or components and then reformed again according to the invention.

Finally, the combination, in the resins and materials of the invention, of acidic hardeners with other types of hardener makes it possible to obtain formulations that have a wide range of mechanical properties at room temperature (control of the Tg, of the modulus).

In contrast with standard thermoset glues and adhesives (epoxys), it is possible to relax the constraints trapped within composite or sandwich structures in the course of their forming or their use and thus improve the mechanical strength and chemical resistance (the resistance to solvents and stress cracking) and the lifetime of components and articles.

DETAILED DESCRIPTION OF THE INVENTION

Figure 1:
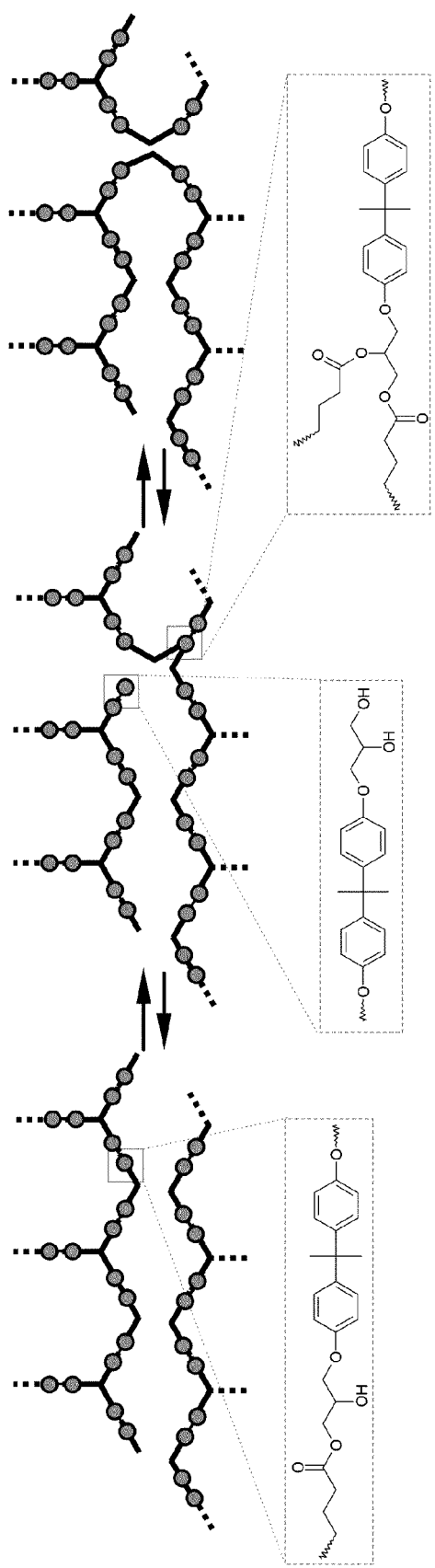
FIG. 1: schematic representation of the transesterification reactions within the polymer network

One subject of the invention is a thermosetting resin composition, this composition resulting from placing in contact:
at least one thermosetting resin precursor, this thermosetting resin precursor comprising hydroxyl functions and/or epoxy groups, and optionally ester functions,
with at least one hardener chosen from carboxylic acids,
in the presence of at least one transesterification catalyst, and whose total molar amount is between 5% and 25% of the total molar amount of hydroxyl and epoxy contained in the thermosetting resin precursor,
the amount of hardener being chosen such that the resin is in the form of a network, and:
$N_O$ denoting the number of moles of hydroxyl functions in the precursor,
$N_x$ denoting the number of moles of epoxy groups in the precursor,
$N_A$ denoting the number of moles of carboxylic acid functions of the hardener that are capable of forming a bond with a hydroxyl function or with an epoxy group of the thermosetting polymer precursor:

$$N_A < N_O + 2N_x$$

When the hardener is a dicarboxylic acid, it is capable of providing two acid functions per molecule and $N_A$ is equal to twice the number of moles of hardener. When the hardener is a tricarboxylic acid, it is capable of providing three acid functions per molecule and $N_A$ is equal to three times the number of moles of hardener. Most of the time, the hardener is a mixture of compounds of diverse functionalities and $N_A$ must be calculated as a function of its composition.

Preferably, the amounts of reagents are chosen such that, after crosslinking, no unreacted epoxy functions remain.

This is reflected by the relationship $N_A > N_x$.

For the purposes of the present invention, the term "thermosetting resin precursor" means an oligomer, a prepolymer, a polymer or any macromolecule which, when reacted with a hardener, also known as a crosslinking agent, in the presence of a source of energy, especially of heat, and optionally of a small amount of catalyst, gives a polymer network that has a solid structure. The thermosetting resins known in the prior art cannot after crosslinking be transformed under the action of heat, since the reactions that led to the formation of a three-dimensional network are irreversible. Thermosetting resins crosslinked with acids have behaviour of elastomer type: their glass transition temperature is less than 20° C.; at room temperature, an article based on thermoset resin is deformable under the action of a mechanical constraint. However, in the resins of the prior art, removing the constraint results in a return to the initial shape of the article, irrespective of the temperature.

The invention more particularly concerns materials obtained by reacting thermosetting resin precursors with one or more hardeners, these materials comprising a) ester functions and b) hydroxyl functions.

These materials comprise ester functions and generally result from the polymerisation reaction between a hardener comprising at least one polycarboxylic acid and a thermosetting resin precursor comprising at least one epoxy function or one hydroxyl function. Other types of precursor and of hardener resulting in a resin bearing free hydroxyl groups and ester functions may be envisaged.

According to the invention, precursors that comprise free hydroxyl functions and/or epoxy groups are selected. These free hydroxyl functions and epoxy groups are capable of reacting with the reactive functions of the hardener to form a three-dimensional network maintained by ester functions. It may be envisaged for the thermosetting resin precursor itself to be in the form of a polyether or polyester chain that comprises hydroxyl functions and/or epoxy groups capable of participating in a crosslinking reaction in the presence of a hardener. It may also be envisaged for the thermosetting resin precursor to be in the form of an acrylic or methacrylic resin comprising epoxy groups.

Preferentially, the invention relates to thermosetting resins of epoxy resin type. Thus, advantageously, the thermosetting resin precursor is an epoxy resin precursor. Advantageously, the epoxy resin precursor represents at least 10% by mass of the mass of thermosetting precursor composition, advantageously at least 20%, preferably at least 40% and better still at least 60%.

A thermosetting resin precursor of epoxy resin type is defined as a molecule containing more than one epoxide group. The epoxide group, also known as oxirane or ethoxyline, is represented by the formula below:

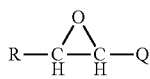

in which Q=H or Q=R', R and R' representing hydrocarbon groups.

There are two major categories of epoxy resin: epoxy resins of glycidyl type, and epoxy resins of non-glycidyl type. Epoxy resins of glycidyl type are themselves classified into glycidyl ether, glycidyl ester and glycidyl amine. Non-glycidyl epoxy resins are of aliphatic or cycloaliphatic type.

Glycidyl epoxy resins are prepared via a condensation reaction of the appropriate dihydroxy compound with a diacid or a diamine and with epichlorohydrin. Non-glycidyl epoxy resins are formed by peroxidation of the olefinic double bonds of a polymer.

Among the glycidyl epoxy ethers, bisphenol A diglycidyl ether (BADGE) represented below is the one most commonly used.

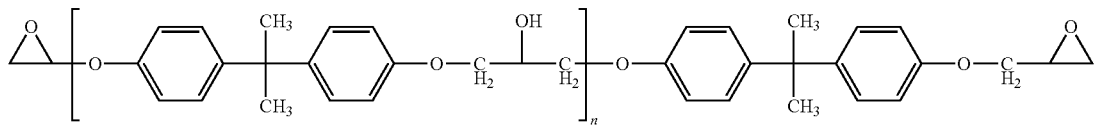

BADGE-based resins have excellent electrical properties, low shrinkage, good adhesion to numerous metals, good moisture resistance, good heat resistance and good resistance to mechanical impacts.

The properties of BADGE resins depend on the value of n, which is the degree of polymerisation, which itself depends on the stoichiometry of the synthesis reaction. As a general rule, n ranges from 0 to 25.

Novolac epoxy resins (whose formula is represented below) are glycidyl ethers of novolac phenolic resins. They are obtained by reacting phenol with formaldehyde in the presence of an acid catalyst to produce a novolac phenolic resin, followed by a reaction with epichlorohydrin in the presence of sodium hydroxide as catalyst.

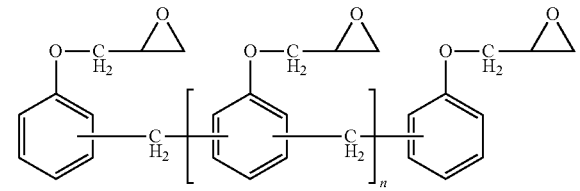

Novolac epoxy resins generally contain several epoxide groups. The multiple epoxide groups make it possible to produce resins with a high crosslinking density. Novolac epoxy resins are widely used for formulating moulded compounds for microelectronics on account of their superior resistance to high temperature, their excellent mouldability, and their superior mechanical, electrical, heat-resistance and moisture-resistance properties.

The epoxy resins to which the invention applies may be any of those provided that their precursors comprise, before reaction with the carboxylic acid, a mean number of epoxide and hydroxyl functions per precursor such that:

$$2 < 2 \langle n_X \rangle + \langle n_O \rangle.$$

This inequality should be considered in the strict sense, $\langle n_X \rangle$ being the numerical mean of the number of epoxy functions per precursor, $\langle n_O \rangle$ being the numerical mean of the number of hydroxyl functions per precursor.

The numerical mean is defined by:

$$\langle n \rangle = \mathrm{sum}(P(i) \ast i)/\mathrm{sum}(P(i)),$$

where $P(i)$ is the number of molecules containing i functions, preferably, $3 \leq 2<n_X>+<n_O>$, even more advantageously, $4 \leq 2<n_X>+<n_O>$.

The thermosetting resin precursor that may be used in the present invention may be chosen especially from: novolac epoxy resins, bisphenol A diglycidyl ether (BADGE), bisphenol F diglycidyl ether, tetraglycidyl methylene dianiline, pentaerythritol tetraglycidyl ether, tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropyleneglycol diglycidyl ether, terephthalic acid diglycidyl ester, epoxidised polyunsaturated fatty acids, epoxidised plant oils, epoxidised fish oils and epoxidised limonene, and mixtures thereof.

Advantageously, it is chosen from: BADGE, epoxidized soja oil and novolac resins.

According to one variant, a subject of the invention is also a repairable epoxy resin composition, containing a first composition containing non-crosslinked epoxy resin and a second composition containing a crosslinking agent based on carboxylic acid and a reaction catalyst, the first and the second compositions being intended to be mixed together just before use, the amount of acid being sufficient for all the epoxy functions to be capable of reacting with the carboxylic functions of the acid.

According to one variant of the invention, the hardener(s) are used in an amount that is sufficient to consume all the free epoxy functions of the resin. According to one preparation method, a hardener of acid type may especially be used in stoichiometric amount relative to the epoxy resin such that all the epoxy functions have reacted with the acid.

A hardener is necessary to form a crosslinked three-dimensional network from an epoxy resin.

A wide variety of hardeners exists for epoxy resins. The agents commonly used for crosslinking epoxides are amines, polyamides, polycarboxylic acids, phenolic resins, anhydrides, isocyanates and polymercaptans. The reaction kinetics and the glass transition temperature, Tg, of the crosslinked resin depend on the nature of the hardener. The choice of resin and of hardener depends essentially on the desired application and properties. The stoichiometry of the epoxy-hardener system also affects the properties of the hardened material.

The resin according to the present invention is manufactured with at least one hardener chosen from carboxylic acids.

Hardeners of the carboxylic acid class are typically used to obtain flexible materials (moderately crosslinked networks with a low Tg).

Carboxylic acids react with epoxide groups to form esters. The presence of at least two carboxylic acid functions on the hardener compound is necessary to crosslink the resin. The presence of at least one hardener compound comprising at least three carboxylic acid functions makes it possible to form a three-dimensional network. Activation with a catalyst is necessary.

The preparation of the resin according to the invention may be performed with one or more hardeners, including at least one of polyfunctional carboxylic acid type. Advantageously, the hardener is chosen from: carboxylic acids in the form of a mixture of fatty acid dimers and trimers comprising 2 to 40 carbon atoms.

As acids that may be used in the invention, mention may be made of carboxylic acids comprising 2 to 40 carbon atoms, such as linear diacids (glutaric, adipic, pimelic, suberic, azelaic, sebacic or dodecanedioic and homologues thereof of higher masses) and also mixtures thereof, or fatty acid derivatives. It is preferred to use trimers (oligomers of 3 identical or different monomers) and mixtures of fatty acid dimers and trimers, in particular of plant origin. These compounds result from the oligomerization of unsaturated fatty acids such as: undecylenic, myristoleic, palmitoleic, oleic, linoleic, linolenic, ricinoleic, eicosenoic or docosenoic acid, which are usually found in pine oil, rapeseed oil, corn oil, sunflower oil, soybean oil, grapeseed oil, linseed oil and jojoba oil, and also eicosapentaenoic acid and docosahexaenoic acid, which are found in fish oils.

As acids that may also be used in the invention, mention may be made of aromatic carboxylic acids comprising 2 to 40 carbon atoms, like aromatic diacids such as phtalic acid, trimellitic acid, terephtalic acid, naphtalenedicarboxylic acid.

Examples of fatty acid trimers that may be mentioned include the compounds of the following formulae that illustrate cyclic trimers derived from fatty acids containing 18 carbon atoms, given that the compounds that are commercially available are mixtures of steric isomers and of positional isomers of these structures, which are optionally partially or totally hydrogenated.

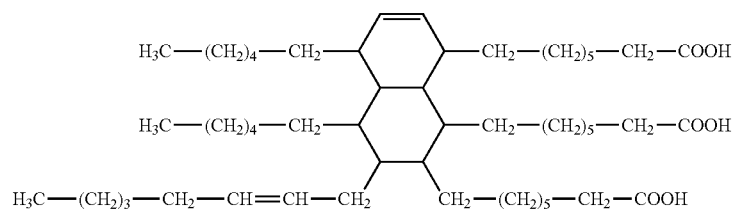

C18 Acid Trimer

A mixture of fatty acid oligomers containing linear or cyclic $C_{18}$ fatty acid dimers, trimers and monomers, the said mixture predominantly being dimers and trimers and containing a small percentage (usually less than 5%) of monomers, may thus be used. Preferably, the said mixture comprises:

0.1% to 40% by weight and preferably 0.1% to 5% by weight of identical or different fatty acid monomers, 0.1% to 99% by weight and preferably 18% to 85% by weight of identical or different fatty acid dimers, and 0.1% to 90% by weight and preferably 5% to 85% by weight of identical or different fatty acid trimers.

Examples of fatty acid dimers/trimers that may be mentioned include (weight %):

Pripol® 1017 from Uniqema or Croda, mixture of 75-80% dimers and 18-22% trimers with about 1-3% fatty acid monomers, Pripol® 1048 from Uniqema or Croda, 50/50% mixture of dimers/trimers, Pripol® 1013 from Uniqema or Croda, mixture of 95-98% dimers and 2-4% trimers with 0.2% maximum of fatty acid monomers, Pripol® 1006 from Uniqema or Croda, mixture of 92-98% dimers and a maximum of 4% trimers with 0.4% maximum of fatty acid monomers, Pripol® 1040 from Uniqema or Croda, mixture of fatty acid dimers and trimers with at least 75% trimers and less than 1% fatty acid monomers, Unidyme® 60 from Arizona Chemicals, mixture of 33% dimers and 67% trimers with less than 1% fatty acid monomers, Unidyme® 40 from Arizona Chemicals, mixture of 65% dimers and 35% trimers with less than 1% fatty acid monomers, Unidyme® 14 from Arizona Chemicals, mixture of 94% dimers and less than 5% trimers and other higher oligomers with about 1% fatty acid monomers, Empol® 1008 from Cognis, mixture of 92% dimers and 3% higher oligomers, essentially trimers, with about 5% fatty acid monomers, Empol® 1018 from Cognis, mixture of 81% dimers and 14% higher oligomers, essentially trimers, with about 5% fatty acid monomers, Radiacid® 0980 from Oleon, mixture of dimers and trimers with at least 70% trimers.

The products Pripol®, Unidyme®, Empol® and Radiacid® comprise $C_{18}$ fatty acid monomers and fatty acid oligomers corresponding to multiples of $C_{18}$.

As diacids that may be used in the invention, mention may also be made of polyoxyalkylenes (polyoxoethylene, polyoxopropylene, etc.) comprising carboxylic acid functions at the ends, phosphoric acid, polyesters and polyamides, with a branched or unbranched structure, comprising carboxylic acid functions at the ends.

Preferably, the hardener is chosen from: fatty acid dimers and trimers and polyoxyalkylenes comprising carboxylic acids at the ends.

The hardener(s) of carboxylic acid type may be used alone or as a mixture with other types of hardener, especially hardeners of amine type and hardeners of acid anhydride type.

In the presence of acidic or basic catalysts, the carboxylic acids react with the epoxide groups to form esters. Hitherto, the catalysts used by those skilled in the art were optimised for this esterification reaction and are added in amounts of between 1 and 3 mol % relative to the epoxy groups [Epoxy Resins, Chemistry and Technology, second edition, published by C. A. May, Marcel Dekker, New York 1988].

A hardener of amine type may be chosen from primary or secondary amines containing at least one $NH_2$ function or two NH functions and from 2 to 40 carbon atoms. This amine may be chosen, for example, from aliphatic amines such as diethylenetriamine, triethylenetetramine, tetraethylenepentamine, dihexylenetriamine, cadaverine, putrescine, hexanediamine, spermine, isophorone diamine, and also aromatic amines such as phenylenediamine, diaminodiphenylmethane, diaminodiphenyl sulfone and methylenebischlorodiethylaniline.

Advantageously, when an amine hardener is used in the mixture, the amine/epoxy ratio is limited so that, in the absence of ester bonds, the tertiary amine bonds thus created are not sufficient to pass the gel point. In practice, a person skilled in the art can rely on the vast literature existing on epoxy-amine systems to select the appropriate composition.

The test described below which concerns the formation of a network may be used to check that the gel point is not exceeded:

In a material, it is considered that the gel point is not reached as long as a cylindrical post made from this material, with an initial height of approximately 1 cm at room temperature and a diameter of 1 cm, after having been left for 10 hours at a temperature of 100° C. and then equilibrated for 30 minutes at room temperature, has a final height that differs by more than 20% from the initial height.

A hardener of anhydride type may be chosen from cyclic anhydrides, for instance phthalic anhydride, methylnadic anhydride, hexahydrophthalic anhydride, dodecylsuccinic anhydride or glutaric anhydride.

Mention may also be made of succinic anhydride, maleic anhydride, chlorendic anhydride, nadic anhydride, tetrachlorophthalic anhydride, pyromellitic dianhydride, 1,2,3,4-cyclopentanetetracarboxylic acid dianhydride, and aliphatic acid polyanhydrides such as polyazelaic polyanhydride and polysebacic polyanhydride.

Advantageously, when one or more hardeners other than a carboxylic acid is used as a mixture with the hardener(s) of carboxylic acid type, the acid represents at least 10 mol %, preferably at least 20 mol %, advantageously at least 40 mol % and better still at least 60 mol % relative to the hardeners as a whole.

According to the prior art, by using an equimolar ratio between the carboxylic acids and the epoxy compounds, a moderately crosslinked polyhydroxy ester network is obtained. With a 2:1 ratio between carboxylic acids and epoxy, a highly crosslinked polyester network is obtained, which does not comprise the free hydroxyl groups necessary for a transesterification reaction.

According to the invention, a compromise must be chosen between the presence of free hydroxyls for performing transesterification reactions and high crosslinking density giving a solid and mechanically strong material.

According to the invention, the hardener is used in an amount sufficient to form a network. In particular, an acid hardener is used in an amount sufficient to form a network based on ester bridges.

For the purposes of the present invention, a network is formed once there is a continuous path formed from a succession of monomers united by ester bridges, this path traversing the sample from end to end. These monomers may originate from the thermosetting precursors and/or from the hardeners. A person skilled in the art knows theoretical and/or empirical guides for determining the compositions that can produce a network from the envisaged resins and hardeners (cf. for example, P. J. Flory *Principles of Polymer Chemistry* Cornell University Press Ithaca-NY 1953).

In practice, the formation of a network is ensured if, after formation of the ester bridges, a cylindrical post made of this material, with an initial height of approximately 1 cm at room temperature and a diameter of 1 cm, after having been left for 10 hours at a temperature of 100° C. and then equilibrated for 30 minutes at room temperature, has a final height differing by less than 20% from the initial height.

According to the invention, at least one diacid or one acid with functionality of greater than two is advantageously used in the hardener in an amount sufficient to form a network.

When a precursor comprising at least two epoxy functions per molecule, and a hardener comprising at least two carboxylic acid functions, are used, using an equimolar ratio of acids and of epoxy, the conditions already stated are sufficient to obtain a network:

$$N_A < N_O + 2N_x$$

$$N_A > N_x$$

At least one of the catalysts must be chosen from transesterification catalysts. Certain transesterification catalysts make it possible to catalyse the reaction of epoxides with the hardener. However, it may also be envisaged to use a specific catalyst for opening epoxies in addition to the transesterification catalyst.

The transesterification catalysts are used in the invention in an amount ranging from 5 mol % to 25 mol % relative to the total molar amount of hydroxyl and of epoxy contained in the thermosetting resin precursor. This proportion of catalyst is significantly higher than the amounts used in the prior art.

According to the invention, the term "transesterification catalyst" means a compound that satisfies the following test:
Catalyst Test:
Preparation of the Ester E1:
6.1 mmol of octanoic acid (Mw=144.2 g/mol, m=0.88 g) and 0.37 mmol (6 mol %) of catalyst C1, 2-methylimidazole (2-MI, Mw=82.1 g/mol, m~30 mg) are placed in a test tube. At room temperature, the octanoic acid is in liquid form, whereas the 2-MI is a solid that sediments to the bottom of the tube. At 120° C. and with slight manual stirring, the catalyst is rapidly dissolved. 6.1 mmol of benzyl glycidyl ether (Mw=164.2 g/mol, m=1 g) are added and the reaction mixture is stirred in order to homogenise it.

The mixture is heated under a stream of nitrogen (~40 mL/min) at 120° C.

The reaction progress is measured by IR spectroscopy by monitoring the intensity of the $u_{C=O}$ bands of the ester at 1735 cm$^{-1}$ and of the acid at 1705 cm$^{-1}$ and also $\delta_{C-O-C}$ (ring vibration) of the epoxy at 915 cm$^{-1}$.

After one hour, it is found by this means that the conversion no longer changes. $^{13}$C NMR analysis (CDCl$_3$/TMS) confirms the disappearance of the [COOH] signal at 181 ppm and the appearance of the [COOR] signal at 174 ppm.

The product obtained at the end of this reaction is the ester E1, which is the product of esterification between octanoic acid and benzyl glycidyl ether, which is confirmed by the $^1$H and $^{13}$C NMR analysis.

Preparation of the Ester E2:
The protocol is identical to the preceding. The reaction mixture is then formed from 6.7 mmol of phenyl glycidyl ether (Mw=150.2 g/mol, m=1 g), 6.7 mmol of decanoic acid (Mw=172.3 g/mol, m=1.15 g) and 0.4 mmol of 2-MI (6 mol %, m~33 mg). The decanoic acid and the catalyst C1 are in solid form: the mixture is thus homogenised with gentle stirring at 120° C. The reaction is performed at 120° C. under a stream of 40 mL/min of nitrogen. The reaction progress is monitored in the same manner as previously: the reaction is complete after one hour. This is confirmed by $^{13}$C NMR. The product obtained is the ester E2.

Transesterification Tests:
0.65 mmol of E1, 0.65 mmol of E2 and 0.032 mmol (5 mol %) of catalyst C2, which is the test product, are placed in a test tube. The mixture is homogenised by heating to 150° C. and gently stirring. The reaction mixture is heated to 150° C. using an oil bath under a stream of 40 mL/min of nitrogen.

Samples are taken regularly in order to monitor the transesterification kinetics. Each sample taken is analysed by gas chromatography coupled to mass spectrometry (GC-MS) using a Shimadzu GCMS-QP 2010S machine. The chromatographic analysis is performed with a Shimadzu GC-2010 machine equipped with a Supelco capillary column (model 28041-U) 12 m long, 0.2 mm inside diameter, packed with a film of 0.33 µm of non-polar poly(dimethylsiloxane) stationary phase (Equity™-1 phase). The vector gas is helium, with an inlet pressure of 34.6 kPa, a total flow rate of 44.4 mL/min, a column flow rate of 0.68 mL/min, a linear velocity of 48 cm/s and a purge flow rate of 3 mL/min.

Injection of 1 µL of a solution in methanol of the product to be analysed at a concentration of between 1 mg/g to 5 mg/g is performed at an injection temperature of 250° C. in split mode, with a split ratio of 60%. The column temperature cycle after injection is composed of a plateau at 80° C. for 30 seconds followed by a ramp of 24° C./minute up to 280° C. This temperature is then kept constant for 7 minutes, for a total analysis time of 16 minutes.

The GC chromatograph is coupled to a Shimadzu electron-impact mass spectrometer (EIMS) at 70 eV. The temperature of the ion source and that of the interface are, respectively, 200 and 300° C.

Figure 2:
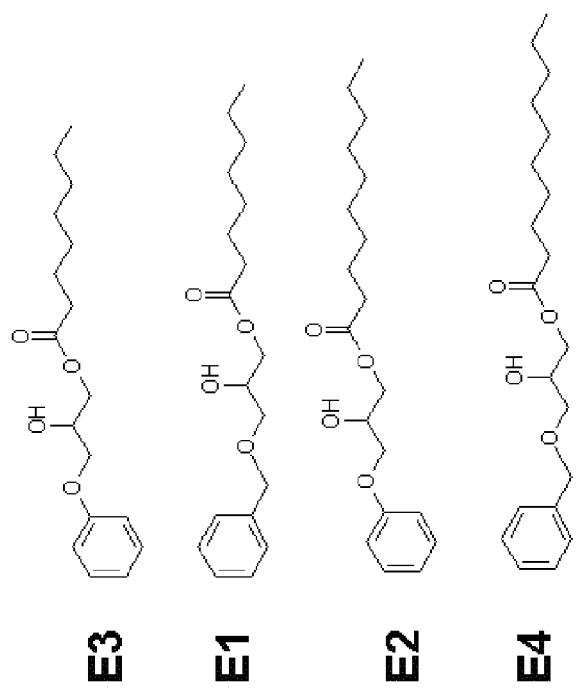
FIG. 2: chromatogram of the products contained in the reaction medium obtained from the transesterification test
Figure 2:
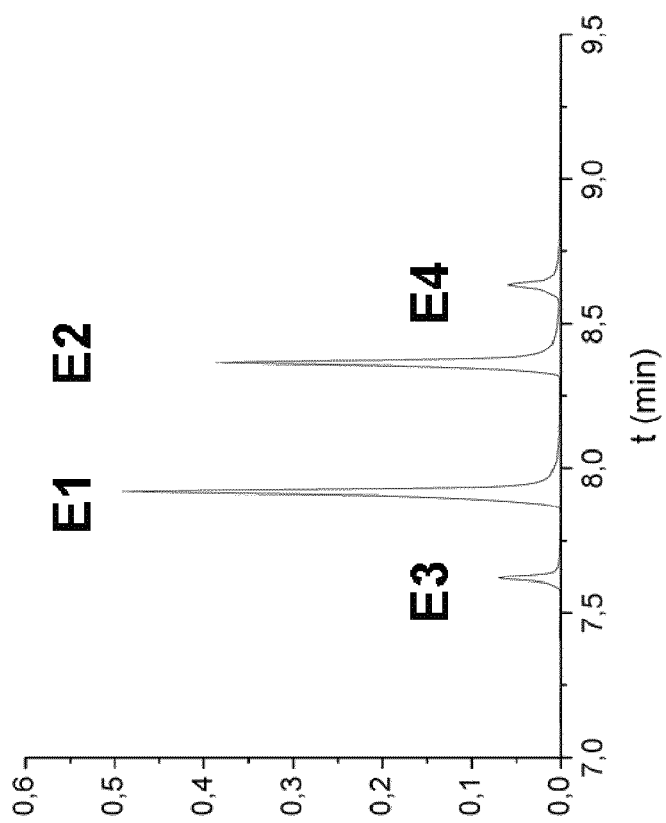
Figure 3:
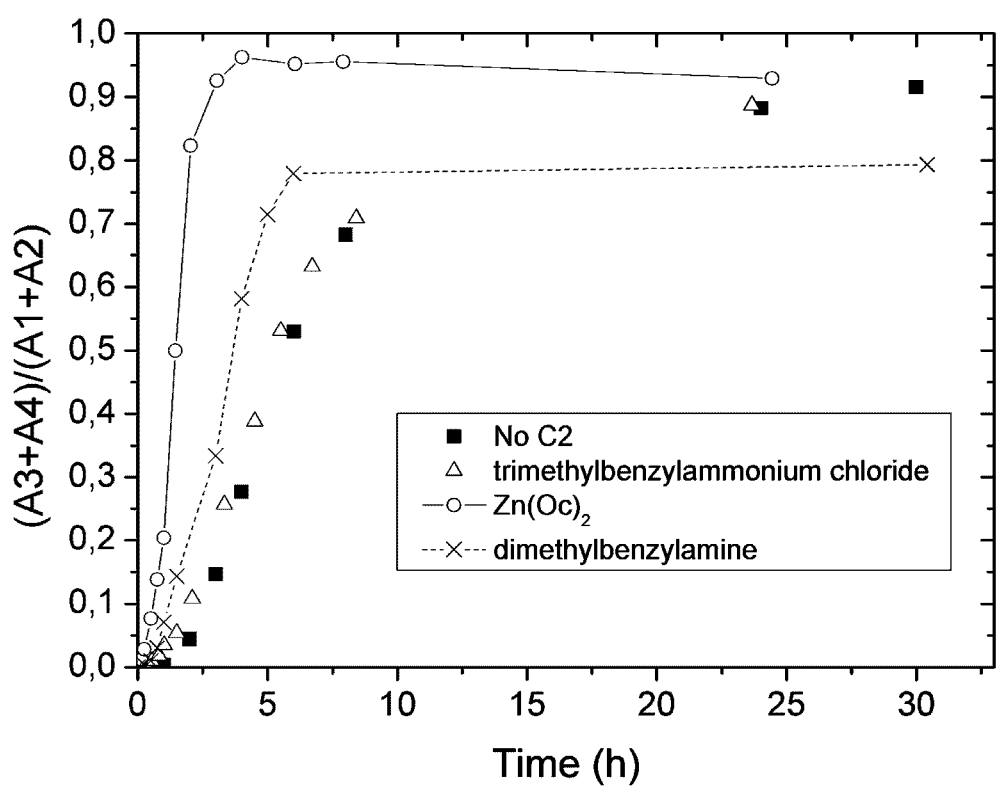
FIG. 3: graphic representation of the transesterification kinetics in the transesterification test

The area of the signals present in the chromatogram of FIG. 2 corresponding to the monoesters E1, E2, E3 and E4, which are exchange products, is measured (these areas are noted A1, A2, A3 and A4, respectively). The monoesters are identified by means of the fragmentation obtained by mass spectrometry. The retention times corresponding to the monoesters E1, E2, E3 and E4 are, respectively, 7.9, 8.4, 7.6 and 8.6 min. The kinetics are obtained by plotting the ratio of the areas (A3+A4)/(A1+A2) as a function of the sampling time, and illustrated in FIG. 3.

A product is considered as being a catalyst for the purposes of the present invention if the time for which the ratio reaches 0.9 is less than 5 hours.

Preferably, the catalyst is chosen from metal salts of zinc, tin, magnesium, cobalt, calcium, titanium and zirconium. It may also be chosen from catalysts of organic nature, such as: benzyldimethylamide, benzyltrimethylammonium chloride.

These catalysts are generally in solid form and, in this case, advantageously in the form of a finely divided powder.

A heterogeneous catalyst may be used, i.e. a catalyst that is not in the same phase as the reagents, or a homogeneous catalyst may be used, which is present in the same phase as the reagents.

The catalyst, solid or liquid, is preferably soluble in the thermosetting resin precursor.

To manufacture the thermosetting resin according to the invention, advantageously, in a first step, the catalyst is dissolved in the hardener composition. When the catalyst is of metallic nature, an exchange takes place between the ligands of the catalyst and the acid groups so as to form a new catalyst: the salt formed from the metal of the catalyst and the carboxylic acid used as hardener. This dissolution advantageously takes place by heating and stirring.

To produce the resin of the invention, the salt of a metal that may be chosen from zinc, tin, magnesium, cobalt, calcium, titanium and zirconium and of an acid that may be chosen from the list of acid hardeners above is thus used as self-catalysed hardener for the crosslinking reaction of the thermosetting resin precursor.

Among the epoxide-opening catalysts that may be used in addition to the transesterification catalyst, mention may be made of: tin tetrachloride, organoboron salts, trialkylamines, hexamethylenetetramine, divalent tin salts, aniline-formaldehyde condensates, tertiary amines, N,N-alkanolamines, metal chelates comprising epoxy groups, amine salts of polyacids, uranium salts, trialkanolamine borates, organosubstituted phosphines, fluoroborates, quaternary ammonium salts, quaternary monoimidazoline salts, dicyanodiamides and imidazolines.

When an epoxide-opening catalyst is used, it is advantageously present in amounts ranging from 0.1 mol % to 5 mol % relative to the number of moles of epoxide groups.

A subject of the invention is also a kit for the preparation of a thermosetting resin or for the preparation of a composite material comprising a thermosetting resin as described above comprising at least one first composition comprising a thermosetting resin precursor, this thermosetting resin precursor comprising hydroxyl functions and/or epoxy groups, and optionally ester functions, at least one second composition comprising a hardener chosen from carboxylic acids and at least one transesterification catalyst, the first and the second composition being in conditioning suitable for preventing the crosslinking reaction between the precursor and the hardener from taking place without intervention of an operator. Such a kit makes it possible to prepare a thermosetting resin, the first and second compositions being mixed together just before use. It may be envisaged for the hardener composition to comprise the catalyst, and preferably the product of the exchange reaction between the ligands of the catalyst and the acid hardener.

Such conditioning may consist of a container comprising two or three internal compartments for separately storing each of the components, it being understood that the catalyst may optionally be stored in the same compartment as the precursor or as the hardener. A means may be provided for placing in contact the contents of the various compartments so as to initiate the crosslinking in the container. A kit consisting of two or three separate flasks combined in the same packaging and each comprising suitable amounts of each product for the preparation of the thermosetting resin, so as to save the user from performing weighing and/or metering operations, may also be provided.

According to one variant, the kit for the preparation of a thermosetting resin may consist of a single container, comprising the mixture of the three components: precursor, carboxylic acid and catalyst. Specifically, in the absence of heating, and unlike epoxy-amine mixtures, the epoxy precursor+ acid mixtures have a stability of about two months at room temperature, even in the presence of catalyst. The operator's intervention is then limited to heating.

A subject of the invention is also compositions of thermosetting composite material comprising at least one thermosetting resin whose composition has been described above. Such a material may comprise, besides the thermosetting resin(s) according to the invention: one or more polymers, pigments, dyes, fillers, plasticizers, fibres, flame retardants, antioxidants, lubricants, wood, glass, metals.

Among the polymers that may be used mixed with the thermosetting resin composition of the invention, mention may be made of: elastomers, thermoplastics, thermoplastic elastomers, impact additives.

The term "pigments" means coloured particles that are insoluble in the epoxy resin. As pigments that may be used in the invention, mention may be made of titanium oxide, carbon black, carbon nanotubes, metal particles, silica, metal oxides, metal sulfides or any other mineral pigment; mention may also be made of phthalocyanins, anthraquinones, quinacridones, dioxazines, azo pigments or any other organic pigment, natural pigments (madder, indigo, crimson, cochineal, etc.) and mixtures of pigments. The pigments may represent from 0.05% to 15% by weight relative to the weight of the material.

The term "dyes" means molecules that are soluble in the epoxy resin and that have the capacity of absorbing part of the visible radiation.

Among the fillers that may be used in the thermosetting resin composition of the invention, mention may be made of: silica, clays, calcium carbonate, carbon black, kaolin, whiskers.

The presence in the thermosetting resin compositions of the invention of fibres such as glass fibres, carbon fibres, polyester fibres, polyamide fibres, aramid fibres, cellulose and nanocellulose fibres or plant fibres (linseed, hemp, sisal, bamboo, etc.) may also be envisaged.

It may also be envisaged for the thermosetting resin compositions of the invention to be used for manufacturing sandwich materials by alternating superposition of layers of resin or of resin-based composite with layers of wood, metal or glass.

The presence in the thermosetting resin composition of pigments, dyes or fibres capable of absorbing radiation may be used to ensure the heating of an article based on such a resin by means of a radiation source such as a laser. The presence in the thermosetting resin composition of pigments, fibres or electrically conductive fillers such as carbon black, carbon nanotubes, carbon fibres, metal powders or magnetic particles may be used to ensure the heating of an article based on such a resin by the Joule effect, by induction or by microwaves. Such heating may allow the use of a process for manufacturing, transforming or recycling an article made of thermosetting resin according to a process that is described below.

A subject of the invention is also a process for manufacturing an article based on a thermosetting resin composition as described above, this process comprising:

a) the placing in contact of a first composition comprising at least one thermosetting resin precursor with a second composition comprising at least one hardener chosen from carboxylic acids, in the presence of at least one transesterification catalyst, b) the forming of the composition obtained from step a), c) the application of energy for hardening the resin, d) cooling of the hardened resin.

The placing in contact of the components may take place in a mixer of any type known to those skilled in the art. The application of energy for hardening the resin in step c) of the process may consist, in a known manner, of heating at a temperature of from 50 to 250° C. The cooling of the hardened resin is usually performed by leaving the material to return to room temperature, with or without use of a cooling means.

The process is advantageously performed in conditions such that the gel point is reached or exceeded at the end of step d). Especially, the process according to the invention advantageously includes the application of sufficient energy at step c) for the gel point of the resin to be reached or exceeded.

For the purposes of the present invention, the term "article" means a thermoset component based on a material comprising a thermosetting resin, in particular an epoxy resin, as described above. It may be an article made of a composite material. It may especially be envisaged to introduce before, during or after step a) one or more additional components that may be chosen especially from polymers, pigments, dyes, fillers, plasticizers, fibres, flame retardants, antioxidants, lubricants, wood, glass and metals. The article may have pores, which are open or closed and filled with gas. Advantageously, in the articles according to the invention, the gel point of the resin is reached or exceeded.

The articles according to the invention may also consist of coatings that are deposited on a support, for instance a protective layer or a paint. They may also consist of an adhesive material.

In practice, the catalyst is first dissolved in the composition comprising the hardener, generally by heating with stirring, and the two compositions are then mixed together.

For example, epoxy-acid networks are obtained by polymerisation of mixtures of acid dimers and trimers and of BADGE.

The synthesis takes place in three steps. First, the catalyst is dissolved in the hardener (for example fatty acid oligomer). This step requires high temperatures for the metal salts (preferably above 180° C.). Solubility is obtained by exchanges between the ligands of the catalysts (acetate, acetylacetonate, octoate, tert-butoxide) and the fatty acids. An evolution of acetic acid has been demonstrated in the case of $Zn(ac)_2$, and may be facilitated when the process is performed under vacuum. Next, the BADGE epoxy resin is introduced and the mixture is stirred with heating until a homogeneous mixture is obtained. The mixture is finally left to harden in a mould for a time sufficient for relaxation of the constraints.

An article resulting from the forming and hardening of the resin composition described above also forms part of the invention.

In particular, the invention relates to a thermoset article or material, based on thermosetting resin that may be obtained via the process described above. Notably, it relates to a thermoset article or material, based on thermosetting resin, this resin having reached or exceeded its gel point.

The term "application of energy for hardening the resin" generally means raising the temperature.

Usually, an article based on thermosetting resin is manufactured by mixing the following components: precursor, hardener, catalyst and additives, introduction in a mould and raising the temperature. The means for manufacturing such an article are well known to those skilled in the art.

However, by means of the resin compositions of the invention, other methods for forming the article than moulding may be envisaged, such as filament winding, continuous moulding or film-insert moulding, infusion, pultrusion, RTM (resin transfer moulding), RIM (reaction-injection moulding) or any other method known to those skilled in the art, as described in the publications "Epoxy Polymer", edited by J. P. Pascault and R. J. J. Williams, Wiley-VCH, Weinheim 2010 or "Chimie industrielle", by R. Perrin and J. P. Scharff, Dunod, Paris 1999.

With the application of such a process to the thermosetting resin compositions of the prior art, once the resin has hardened, the article can no longer be transformed or repaired or recycled. Actually, once the gel point of the resin is reached or exceeded, an article based on a thermosetting resin according to the prior art is no longer transformable or reparable or recyclable.

The application of a moderate temperature to such an article does not lead to any observable or measureable transformation, and the application of a very high temperature leads to degradation of this article.

In contrast, the materials based on thermosetting resin of the invention, on account of their particular composition, can be transformed, repaired and recycled by raising the temperature of the article.

One particular case of an article of the invention consists of a material resulting from the hardening of a resin of the invention. The mechanical properties of such materials are characterized below and illustrate the innovative nature of the invention. These properties are conserved even after transformation of these materials by a process as described above (application of a mechanical constraint and temperature elevation).

Below the glass transition temperature Tg, the polymer is vitreous and has the behaviour of a rigid solid body.

Above the Tg temperature, it has viscoelastic behaviour over a broad temperature range, with a storage modulus of between $1\times10^5$ and $5\times10^6$ Pa according to the composition. This storage modulus may be determined by means of a mechanical dynamic measurement at 1 Hz known to those skilled in the art. In a constraint relaxation experiment, in which a constant deformation is applied to the sample at a given temperature, it is found that the constraint decreases at long times. Such a decrease in constraint does not appear in the case of standard thermoset materials, apart from under conditions of degradation of the material. The quasi-exponential decrease of the constraint with time makes it possible to define the relaxation time $\tau_R$ of the material and also the plateau modulus $G_0$: $G(t) \approx G_0 * \exp(-t/\tau_R)$. The viscosity of the material may be calculated via the relationship: $\eta = \tau_R \times G_0$, with $\eta$ being the viscosity in Pa·s, $G_0$ in Pa, and $\tau_R$ in seconds.

Depending on the composition, the viscosity determined using a 10% deformation for the constraint relaxation varies between $10^5$ Pa·s and $5\times10^9$ Pa·s at a temperature of Tg+150° C. for the materials according to the invention. The degree of relaxed constraint: $(G_0-G(t))/G_0$ is greater than 20% after 3 hours of relaxation.

The invention thus also relates to an article or material resulting from the hardening of a resin of the invention, whose viscosity is between $10^5$ and $5\times10^9$ Pa·s at temperatures of between 150° C. and 300° C.

This slow variation in viscosity over a broad range of temperatures makes the behaviour of the material comparable to that of inorganic glasses and allows additional transformation processes to be applied thereto relative to those that can be applied to thermoplastics.

For the same composition, the viscosity of the material follows a dependency of Arrhenius type as a function of the temperature, and does so over a broad temperature interval (typically 100° C. to 300° C.): $\eta = B \times \exp(-A/T)$, where A is the activation parameter in $K^{-1}$, T is the absolute temperature in K, and B is a constant in Pa·s. The activation parameter value is typically between 7000 and 12000 $K^{-1}$.

From a practical point of view, this means that, within a broad temperature range, the article can be deformed, and then in a second stage, the internal constraints can be removed at a higher temperature.

Without forasmuch being bound to this explanation, the inventors think that the transesterification exchanges are the cause of the relaxation of constraints and of the variation in viscosity at high temperatures. In terms of application, these materials can be treated at high temperatures, where a low viscosity allows injection or moulding in a press. It should be noted that, contrary to Diels-Alder reactions, no depolymerisation is observed at high temperatures and the material conserves its crosslinked structure. This property allows the repair of two parts of an article. No mould is necessary to maintain the shape of the components during the repair process at high temperatures. Similarly, components can be transformed by application of a mechanical constraint to only one part of an article without the need for a mould, since the material does not flow. However, large-sized components, which have more of a tendency to collapse, can be maintained by a support frame, as in the case of glassworking.

Another subject of the invention is thus a process for transforming at least one article made from a material as described above, this process comprising: the application to the article of a mechanical constraint at a temperature (T) above room temperature.

Preferably, in order to enable transformation within a time that is compatible with industrial application of the process, the process comprises the application to the article of a mechanical constraint at a temperature (T) above the glass transition temperature Tg of the material of which the article is composed.

Usually, such a process is followed by a step of cooling to room temperature, optionally with application of at least one mechanical constraint.

For the purposes of the present invention, the term "mechanical constraint" means the application of a mechanical force, locally or to all or part of the article, this mechanical force tending towards forming or deforming the article.

Among the mechanical constraints that may be used, mention may be made of: pressure, moulding, blending, extrusion, blow-moulding, injection-moulding, stamping, twisting, flexing, pulling and shearing.

It may be, for example, twisting applied to a strip of material of the invention. It may be a pressure applied by means of a plate or a mould onto one or more faces of an article of the invention, stamping a pattern in a plate or sheet made of material of the invention. It may also be a pressure exerted in parallel onto two articles made of materials of the invention in contact with each other so as to bring about bonding of these articles. In the case where the article consists of granules of material of the invention, the mechanical constraint may consist of blending, for example in a blender or around an extruder screw. It may also consist of injection-moulding or extrusion. The mechanical constraint may also consist of blow-moulding, which may be applied, for example, to a sheet of material of the invention. The mechanical constraint may also consist of a plurality of separate constraints, of identical or different nature, applied simultaneously or successively to all or part of the article or in a very localised manner.

This transformation may include mixing or agglomeration with one or more additional components chosen from: one or more polymers, pigments, dyes, fillers, plasticizers, fibres, flame retardants, antioxidants, lubricants, wood, glass or metals.

Assembling, bonding and repair are particular cases of the transformation process described above.

This raising of the temperature of the article may be performed by any known means such as heating by conduction, convection, induction, spot heating, infrared, microwave or radiant heating. The means for bringing about an increase in temperature of the article in order to perform the processes of the invention comprise: an oven, a microwave oven, a heating resistance, a flame, an exothermic chemical reaction, a laser beam, a hot iron, a hot-air gun, an ultrasonication tank, a heating punch, etc.

The temperature increase may or may not be brought about in stages, and its duration is adapted to the expected result as a function of the indications that will be given and of the examples detailed below.

The process of the invention is based on transesterification reactions that are promoted by the presence of the catalyst and by the free OH functions within the polymer network in the materials of the invention according to dynamics illustrated in FIG. 1.

Although the material does not flow during the transformation, by means of the transesterification reactions, by selecting an appropriate temperature, heating time and cooling conditions, the new shape may be free of any residual constraint. The material is thus not embrittled or fractured by the application of the mechanical constraint. Furthermore, the component will not return to its first shape. Specifically, the transesterification reactions that take place at high temperature promote a reorganisation of the crosslinking points of the polymer network so as to cancel out the mechanical constraints. A sufficient heating time makes it possible to completely cancel these mechanical constraints internal to the material that have been caused by the application of the external mechanical constraint.

This method thus makes it possible to obtain stable complex shapes, which are difficult or even impossible to obtain by moulding, from simpler elemental shapes. Notably, it is very difficult to obtain by moulding shapes resulting from twisting.

According to one variant, a subject of the invention is a process for obtaining and/or repairing an article based on epoxy resin, comprising:
 at least one step (a) of reaction of the epoxy functions of the said resin with at least one carboxylic acid to form an article,
 a step (b) of placing at least two articles as obtained in step (a) in contact, and
 a step (c) of applying a temperature (T) above room temperature so as to obtain a single article.

For the purposes of the present invention, the term "article" especially means a component made of epoxy material; in particular a composite material, a foam, a film or a stack of films or sheets.

For the purposes of the present invention, the term "damage" means a scratch, a surface or deep crack that may lead to complete rupture of the article along one of its dimensions or any other defect microscopically induced in the course of stresses on or ageing of the article.

According to the invention, the temperature (T) during step (b) is chosen within the range from 50° C. to 250° C. and preferably from 100° C. to 200° C.

Preferably, the carboxylic acid is used in step (a) in a stoichiometric amount relative to the epoxy functions. Advantageously, the carboxylic acid comprises 2 to 40 carbon atoms. Preferably, the carboxylic acid is a mixture of fatty acid dimers and trimers.

Preferably, this process comprises the addition of a catalyst during step (a) and/or during step (b). Advantageously, the catalyst is chosen from metal salts of zinc, tin, magnesium, cobalt, calcium, titanium and zirconium that have been described above.

Preferably, the catalyst is used in a content of from 0.1% to 10% by mass relative to the total mass of the material, and preferably from 0.5% to 5%.

According to this variant, the process advantageously comprises during step (a) the addition of at least one amine, preferably a secondary or tertiary amine containing 2 to 40 carbon atoms.

Preferably, the amine is added during step (a) after the addition of the acid.

Advantageously, according to this variant, the amount of epoxy is such that all the epoxy functions have reacted with the acid or amine functions.

An article made of material of the invention may also be recycled:
 either via direct treatment of the article: for example, the broken or damaged article is repaired by means of a transformation process as described above and may thus regain its prior working function or another function;
 or the article is reduced to particles by application of mechanical grinding, and the particles thus obtained may then be used in a process for manufacturing an article. In particular, according to this process, particles of material of the invention are simultaneously subjected to a raising of temperature and a mechanical constraint allowing them to be transformed into an article.

The mechanical constraint that allows the transformation of particles into an article may, for example, comprise compression in a mould, blending or extrusion.

This method thus makes it possible, by applying a sufficient temperature and an appropriate mechanical constraint, to mould articles from the thermoset material. Especially, it makes it possible to mould articles from the material based on thermoset resin having reached or exceeded the gel point.

Another advantage of the invention is that it allows the manufacture of materials made of thermoset resin from liquid starting materials, in the form of elemental components or units based on thermoset resin having reached or exceeded the gel point: particles, granules, beads, rods, plates, sheets, films, strips, stems, tubes, etc. via any process known to those skilled in the art. These elemental components may then be transformed under the combined action of heat and of a mechanical constraint into articles of the desired shape: for example, strips may, by stamping, be chopped into smaller pieces of chosen shape, sheets may be superposed and assembled by compression. These elemental components based on thermoset material, especially based on epoxy resin, are easier to store, transport and handle than the liquid formulations from which they are derived. Specifically, the step for transforming the components according to the invention may be performed by the final user without chemical equipment (no toxicity or expiry date or VOC, and no weighing out of reagents).

A subject of the invention is thus a process for manufacturing at least one article based on thermosetting resin, which is a particular case of the transformation process already described, this process comprising:
  a) the use as starting material of a material or article of the invention in the form of an elemental unit or an assembly of elemental units,
  b) the simultaneous application of a mechanical constraint and an increase of temperature to form the article,
  c) cooling of the article resulting from step b).

Especially at step a), the material or article of the invention is advantageously based on thermoset resin having reached or exceeded the gel point.

Another advantage of this process is that it allows the recycling of the material after use, it being possible for articles to be reconditioned in the form of elemental units or components and then reformed again according to the invention.

One subject of the invention is thus a process for recycling an article made of material of the invention, this process comprising:
  a) the use of the article as starting material,
  b) the application of a mechanical constraint, and optionally of a simultaneous increase of temperature, to transform this article into an assembly of elemental units,
  c) cooling of this assembly of elemental units.

Especially at step a), the article is advantageously based on thermoset resin having reached or exceeded the gel point The term "elemental units" means components that have a standardised shape and/or appearance that are suited to their subsequent transformation into an article, for instance: particles, granules, beads, rods, plates, sheets, films, strips, stems, tubes, etc. The term "assembly of elemental units" means at least two elemental units, better still at least three, even better still at least 5, preferentially at least 10, even more preferentially at least 100, advantageously at least $10^3$, even more advantageously at least $10^4$ and preferentially at least $10^5$.

The materials and processes of the invention make it possible to overcome the drawbacks of the materials of the prior art, which are the non-transformability and the non-recyclability of articles based on epoxy resin, especially when these resins have reached or exceeded their gel point. They especially make it possible to transform and recycle as many times as desired the article based on epoxy resin. The process also makes it possible to manufacture epoxy resins in a solid form, which is easy to store, to transport and to handle, these new forms of epoxy resin, referred to as elemental units, being useable directly for the manufacture of articles by applying a transformation step conventionally used for thermoplastics. Finally, these resins and these materials allow new applications of thermosetting resins by the application of new transformation methods for these resins and by the possibility of programming controlled transformations of these materials.

The fields of application of these materials are all those of thermosetting resins: materials and composites for motor vehicles, for aeronautical construction, electronics, sport, construction, printing and packaging.

The compositions that are the subject of the invention are advantageously intended to be applied to a metal support, in the form of a varnish, a paint, an anticorrosion protective coat or a protective coat on an electronic circuit. It may also be used as a seal or a layer of glue or adhesive.

EXAMPLES

I—Synthesis Examples

I-1 Example 1

Synthesis with Catalyst, Material (1) According to the Invention

First Step: Dissolution of the Catalyst and Ligand Exchange 20 g of Pripol® 1040 [molar mass per COOH 296 g/mol, dimer content (23%), trimer content (77%)] and 742 mg of zinc acetate dihydrate (3.47 mmol), i.e. a [Zn]/[COOH] mole ratio of 0.05, are placed in a 100 ml round-bottomed flask. The mixture is heated under vacuum in stages from 110° C. to 170° C. over 3 hours until dissolution of the catalyst grains is complete. A strong evolution of gas is observed, which confirms the loss of the acetate ligands, replaced by the fatty acids.

Second Step: Reaction with the Epoxy Resin 15.75 g of the mixture prepared in the first step are added to 9.25 g of BADGE [molar mass per epoxy 174 g/mol] (for a [COOH]/[epoxy] ratio close to 1) in a Teflon beaker. The reaction mixture is homogenised by heating (~130° C.) with mechanical stirring. The mixture is then poured into a mould formed from a brass plate 1.4 mm thick pierced with a rectangular hole, placed between two sheets of non-stick paper, and then pressed at a pressure of 10 MPa at 130° C. for 4 hours. An analysis by IR spectroscopy shows the disappearance of the $u_{C=O}$ band of the acid at 1705 cm$^{-1}$ and also $\delta_{C-O-C}$ (ring vibration) of the epoxy at 915 cm$^{-1}$ and the appearance of the $u_{C=O}$ band of the ester at 1735 cm$^{-1}$.

I-2—Comparative Example 1

Synthesis without Catalyst

The same protocol as in §I-1 is used. 15.75 g of Pripol® 1040 and 9.25 g of BADGE (acid/epoxy stoichiometric proportions) are placed in a Teflon beaker. The reaction mixture is homogenised by heating (~130° C.) with mechanical stirring. The mixture is then placed in a mould, in a press (pressure of 10 MPa) at 130° C. for 24 hours. The reaction is continued by placing the plate cut out of the mould in a vacuum oven at 130° C. for a further 24 hours. The IR spectroscopic analyses show as previously that the reaction is complete.

II—Example 2

Repair in a Press

Samples of plates prepared according to Example I-1 and I-2 are chopped into fragments from 2 mm to 5 mm in size.

These fragments are placed in a brass mould 1.35 mm thick pierced with a circular aperture, between two sheets of non-stick paper. The assembly is then placed in a press at 150° C., for 1 hour 30 minutes, at a pressure of 5 MPa.

In the catalysed case (I-1), a circular plate of repaired material is observed, the fragments being solidly bound together and the joints being smooth and sparingly visible. In the non-catalysed case (I-2), the plate shows very little cohesion, the fragments not being bound together.

III—Example 3

Shear Experiments

Rectangular strips 5 mm wide, 25 mm long and 1.35 mm thick are cut using a punch from a plate of material synthesized according to Example I-1 or I-2. Two strips are placed one on the other, by superposing over a length of 15 mm in accordance with FIG. 7 of standard ASTM D3983. The assembly is compressed from a thickness of 2.70 mm to a thickness of 2 mm (i.e. a compression of 26%) using a Mohr clip and 2 mm blocks.

The strips thus compressed are placed in an oven for 1 hour at a temperature of 150° C. After cooling the Mohr clip is taken off and a tensile test is performed at room temperature at a constant travelling speed (5 mm/minute) on an Instron® machine. The force is measured as a function of the displacement, which reaches its maximum just before the assembly breaks.

In the case of the sample prepared without catalyst (I-2), the maximum force is 11.8 N, whereas it is 26.8 N in the case of the sample prepared with catalyst (I-1).

IV—Example 4

Repeatability of the Repair

Two rectangular strips 5 mm wide, 25 mm long and 1.35 mm thick are cut out of the material of Example I-1. The two strips are placed one on the other, by superposing over a length of 15 mm as previously, and compressed at room temperature in a Mohr clip to 2 mm. After one hour, the sample is removed from the Mohr clip and placed in an oven at 150° C. for 1 hour (sample 4.a). A control experiment is performed without heating the sample, but leaving it to stand for 1 hour after compression (sample 4.b).

A tensile test is performed under the same conditions as in Example 3. For sample 4.b, the maximum force obtained is 6.4 N. For sample 4.a, after breaking, the two strips are reassembled on each other (the same faces always being placed together), compressed at room temperature and then placed in an oven for one hour at 150° C. This bonding/peeling process was repeated 4 times. The following maximum force values are obtained for the 4 consecutive experiments: 17.3; 18.7; 16.3 and 17.2 N, i.e. an average of 17.4±1 N.

V—Example 5

Injection Experiments

The material (1) described in Example I-1 contains a specific transesterification catalyst. The ester functions, formed by reaction between the acids and the epoxy functions, are capable of exchanging with the hydroxyl functions via transesterification reactions at a suitable temperature. The networks thus obtained are dynamic by bond exchange. At high temperature, the dynamic nature allows "flow" of a crosslinked network and relaxes the constraints during moulding. The latter characteristic is very useful in the case of epoxy-acid networks for avoiding shrinkage, which is constantly observed on account of the many unrelaxed constraints.

Injection-moulding is performed using the totally crosslinked materials with a DSM Xplore 12 injector into a dumbbell-shaped specimen mould according to standard ISO 527-3.

V-1 Material 1 a) First Test:

Material (1) is chopped into several pieces with a side length of 2-3 mm, and then placed in the barrel brought to a temperature of 250° C. After a few seconds of temperature establishment, the material is injected into a mould left at room temperature, by means of a 16-bar pressure for a total cycle of 30 seconds. The injected specimen is immediately removed from the mould: within a few minutes, very substantial shrinkage is observed (specimen length: 4.8 cm versus 7.2 cm for a specimen cut by a punch, i.e. shrinkage of 33%).

This first test shows that the constraints have not had the time to relax. This may arise from the fact that the material cooled too quickly on contact with the mould and set the constraints. The following tests are performed with a mould heated to 200° C. (machine limit).

b) Second Test:

The same experiment is performed with the mould brought to a temperature of 200° C. The injection temperature is 250° C. The pressure used is identical (16 bar). After annealing for 10 minutes at 200° C., the mould is left to return to room temperature over about 6 hours.

No shrinkage is observed.

The injection/mould-stripping cycle lasted about 6 hours, which is sparingly compatible with industrialisation of the process. In order to overcome this problem, a system of cooling the mould with water is installed, which makes it possible to go from 200° C. to 20° C. in about 5 minutes.

c) Third Test:

The conditions of the test are identical to those of the preceding test. After annealing for 10 minutes at 200° C., the mould is cooled over 5 minutes by the water-cooling circuit. The specimen obtained here shows no defects and no shrinkage.

V-2 Non-Catalysed Comparative Material 1

For comparative purposes, injection under conditions identical to the preceding third test is performed with an uncatalysed epoxy/acid material (see §I-2 for the synthesis). A specimen broken in several pieces, with many white parts (agglomerated powder), is then obtained: injection cannot be performed for this material.

V-3 Conclusion

The addition of a suitable catalyst to the synthesis of the epoxy/acid materials thus makes it possible to perform injections of thermosets without shrinkage after the mould-stripping step. This is made possible by constraint relaxations in the network, directly associated with exchanges of the ester bonds (crosslinking points) by transesterification reactions. The catalyst used (zinc acetate) allows relaxation of the constraints within timescales that are compatible with injection moulding for temperatures close to 250° C., which necessitates the presence of heating/cooling cycles in the process. In the case of the first tests, this injection/cooling cycle was able to be reduced to about 15 minutes (with annealing to ensure that all the constraints were relaxed).

Finally, this heating step may advantageously be used to complete the chemical crosslinking and thus reduce the preparation time for the materials.

VI—Example 6

Relaxation Experiments

Constraint relaxation experiments on the materials described in Example 1 §I-1 were performed on an Anton Paar MCR 501 rheometer. Discs 26 mm in diameter are cut using a punch out of plates of materials 1.4 mm thick. After having equilibrated the sample at a given temperature, a 10% deformation is applied by means of a plate-plate geometry 25 mm in diameter. The change of the relaxation modulus G(t) over time thus measured may be modelled on a simple exponential relaxation model (equation 1), where $G_0$ is the plateau modulus and t is the relaxation time.

$$G(t)=G_0 e^{-t/\tau} \quad (Eq. 1)$$

Figure 4:
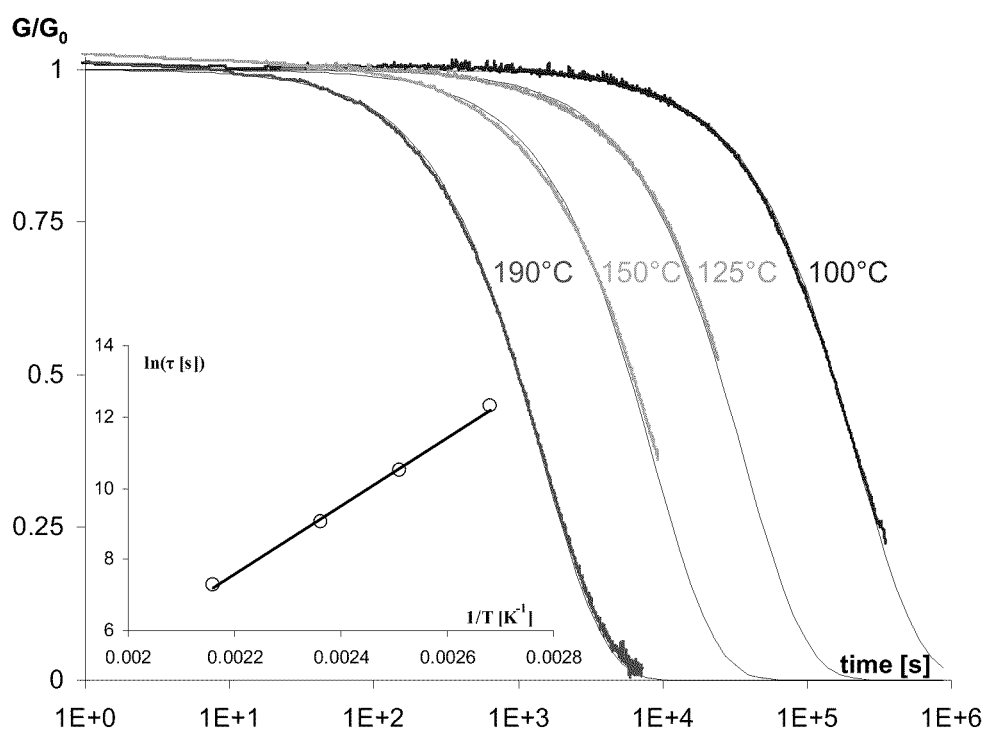
FIG. 4: constraint relaxation data for the epoxy-acid networks, catalysed with $Zn(Ac)_2$ (5 mol %).

The constraint relaxation curves are represented in FIG. 4. The $G_0$ and $\tau$ parameters used to model the data for each sample are given in Table 2.

The inset FIG. 4 shows dependency of Arrhenius type of the relaxation times to temperature: $\tau=B\times\exp(-A/T)$. The activation parameter A is estimated at 10 K.

TABLE 1

Parameters chosen to model the constraint relaxations for the epoxy-acid networks, catalysed with $Zn(Ac)_2$ at 5 mol %

| Temp [° C.] | $G_0$ (kPa) | $\tau$ (h) |
|---|---|---|
| 100 | 152 | 61 |
| 125 | 265 | 10 |
| 150 | 369 | 2.4 |
| 190 | 390 | 0.4 |

VII—Example 7

Transformation of a Material According to the Invention by Hot Fashioning

A plate of material is synthesized as in Example 1, but with twice the amount of catalyst (10 mol % relative to the epoxy functions). A strip of dimensions 100 mm×8 mm×1.4 mm is cut out using a guillotine. This strip is held at both ends by two clamps and torsion corresponding to 1 turn is applied. This deformation is kept constant by fixing the two clamps using stands. In order to observe the birefringence of the sample in the course of the experiment, the assembly is placed between two crossed polaroids and backlit using a negatoscope, and the images are recorded using a digital camera.

The strip is then heated using a Steinel HL 1910 E model hot-air gun on position 9 level 2 at a distance of about 5 cm.

Results

At the applied deformation, the mechanical birefringence reveals highly coloured zones close to the axis of the sample and close to the edges of the sample and two neutral lines (dark and sparingly coloured) approximately halfway between the axis of the sample and the edges. After less than 10 minutes, the birefringence has totally disappeared. When the sample is removed from the clamps, it is found that the sample does not resume its initial shape, but conserves a helical deformation, identical to the imposed deformation.

The invention claimed is:

1. A hot transformable and repairable, after hardening thermosetting resin composition prepared by contacting at least one thermosetting resin precursor comprising hydroxyl functions and/or epoxy groups with at least one carboxylic acid hardener in the presence of at least one transesterification catalyst the total molar amount of which is between 5% and 25% of the total molar amount of hydroxyl and epoxy contained in the thermosetting resin precursor to form a thermosetting resin as a network, wherein $N_A < N_O + 2N_x$ and:
    $N_O$ denotes a number of moles of hydroxyl functions in the precursor;
    $N_x$ denotes a number of moles of epoxy group in the precursor; and
    $N_A$ denotes a number of moles of acid functions of the hardener that are capable of forming a bond with a hydroxyl function or with an epoxy group of the thermosetting polymer precursor,
    wherein the carboxylic acid hardener comprises a mixture of fatty acid dimers and trimers comprising 2 to 40 carbon atoms, and
    wherein the composition, after hardening, is able to be heated to temperatures such that the composition becomes liquid without suffering destruction or degradation of its structure,
    wherein the composition, after hardening, is able to be repaired, after having undergone damage, by subjecting the composition to a temperature above room temperature and to a mechanical constraint.

2. The composition of claim 1, wherein the at least one thermosetting resin precursor further comprises an ester function.

3. The composition of claim 1, wherein the at least one thermosetting resin precursor is an epoxy resin precursor further defined as a bisphenol A diglycidyl ether, epoxidized soja oil, or a novolac resin.

4. The composition of claim 1, wherein $N_A > N_x$.

5. The composition of claim 1, wherein the at least one thermosetting resin precursor is an epoxy resin precursor.

6. The composition of claim 1, wherein the at least one thermosetting resin precursor is defined as having $2 < 2 < n_x > + < n_O >$ and:
    $< n_x >$ is a numerical average of the number of epoxy functions per precursor; and
    $< n_O >$ is a numerical average of the number of hydroxyl functions per precursor.

7. The composition of claim 1, wherein the catalyst is a metal salt of zinc, tin, magnesium, cobalt, calcium, titanium, or zirconium or benzyldimethylamide or benzyltrimethylammonium chloride.

8. A motor vehicle, an aeronautical construction, an electronic component, a sports equipment, a construction, a printing or a packaging comprising a composition according to claim 1.

9. An article comprising a composition of claim 1 obtained by the process comprising:
- placing in contact a first composition comprising the at least one thermosetting resin precursor and a second composition comprising the at least one carboxylic acid hardener in the presence of the at least one transesterification catalyst to create a resin mixture;
- forming the resin mixture;
- hardening the resin mixture into the hardened resin using heat; and
- cooling the hardened resin.

10. The article of claim 9, further defined as having a storage modulus of between $1 \times 10^5$ and $5 \times 10^6$ Pa above the glass transition temperature Tg of the resin.

11. The article of claim 9, further defined as having a viscosity of between $10^5$ and $5 \times 10^9$ Pa·s at temperatures of between 150 and 300° C.

12. The article of claim 9, further comprising one or more additional components chosen from polymers, pigments, dyes, fillers, plasticizers, fibres, flame retardants, antioxidants, lubricants, wood, glass and metals.

13. The article of claim 9, further defined as a motor vehicle, aeronautical construction, an electronic component, sports equipment, construction, printing or packaging.

14. The article of claim 9, wherein the resin has reached or exceeded its gel point.

15. A process for transforming an article of claim 9 comprising applying to the article a mechanical constraint at a temperature (T) above room temperature.

16. The process of claim 15, wherein T is above the glass transition temperature Tg of the material of which the article is composed.

* * * * *